US012692331B2

(12) United States Patent
Hong et al.

(10) Patent No.: US 12,692,331 B2
(45) Date of Patent: Jul. 28, 2026

(54) METHOD OF PREPARING POLYMER

(71) Applicant: LG CHEM, LTD., Seoul (KR)

(72) Inventors: Sung Won Hong, Yuseong-gu (KR); Hyung Sub Lee, Yuseong-gu (KR); Dae Woo Lee, Yuseong-gu (KR); Woo Ri Kim, Yuseong-gu (KR); Min Cheol Ju, Yuseong-gu (KR); Min Seung Shin, Yuseong-gu (KR); In Soo Kim, Yuseong-gu (KR)

(73) Assignee: LG CHEM, LTD., Seoul (KR)

( * ) Notice: Subject to any disclaimer, the term of this patent is extended or adjusted under 35 U.S.C. 154(b) by 499 days.

(21) Appl. No.: 18/280,845

(22) PCT Filed: Jan. 17, 2023

(86) PCT No.: PCT/KR2023/000778
§ 371 (c)(1),
(2) Date: Sep. 7, 2023

(87) PCT Pub. No.: WO2023/136699
PCT Pub. Date: Jul. 20, 2023

(65) Prior Publication Data
US 2024/0150504 A1 May 9, 2024

(30) Foreign Application Priority Data

Jan. 17, 2022 (KR) ........................ 10-2022-0006608
Jan. 16, 2023 (KR) ........................ 10-2023-0006115

(51) Int. Cl.
*C08F 212/10* (2006.01)
*C08F 2/18* (2006.01)
*C08F 212/12* (2006.01)
*C08F 220/44* (2006.01)

(52) U.S. Cl.
CPC .............. *C08F 212/10* (2013.01); *C08F 2/18* (2013.01); *C08F 212/12* (2013.01); *C08F 220/44* (2013.01)

(58) Field of Classification Search
CPC .... C08F 212/06; C08F 212/10; C08F 212/12; C08F 220/42; C08F 220/44; C08F 2/00–60
See application file for complete search history.

(56) References Cited

U.S. PATENT DOCUMENTS

2006/0111529 A1    5/2006    Boevenbrink et al.
2012/0245315 A1    9/2012    Hogt et al.
2016/0108224 A1    4/2016    Seo et al.
2022/0204666 A1    6/2022    Ju et al.
2022/0235158 A1    7/2022    Ju et al.

FOREIGN PATENT DOCUMENTS

| CN | 105008417 A | 10/2015 | |
|---|---|---|---|
| CN | 110785445 A | 2/2020 | |
| CN | 113728021 A | 11/2021 | |
| JP | 2006-522844 A | 10/2006 | |
| JP | 4657492 B | 3/2011 | |
| JP | 2013-513680 A | 4/2013 | |
| KR | 10-0134640 B | 4/1998 | |
| KR | 10-0193022 B1 | 6/1999 | |
| KR | 10-0893873 B1 | 4/2009 | |
| KR | 10-1093477 B1 | 12/2011 | |
| KR | 10-2012-0032668 A | 4/2012 | |
| KR | 10-2015-0037459 A | 4/2015 | |
| KR | 10-1646311 B1 | 8/2016 | |
| KR | 10-2017-0076272 A | 7/2017 | |
| KR | 10-2018-0076645 A | 7/2018 | |
| KR | 10-2021-0062312 A | 5/2021 | |
| KR | 10-2021-0062313 A | 5/2021 | |
| WO | WO-2019225827 A1 * | 11/2019 | ........... C08F 220/00 |
| WO | 2021/101099 A1 | 5/2021 | |

OTHER PUBLICATIONS

Extended European Search Report (EESR) issued in corresponding European application 23740542.8 dated Jul. 15, 2024.
International Search Report (with translation) and Written Opinion dated Apr. 17, 2023 for corresponding International Patent Application No. PCT/KR2023/000778.
Office Action dated Mar. 30, 2026 issued in the corresponding Chinese Patent Application No. 202380010629.1. (Note: JP 2006522844 A, KR 20150037459 A, JP 2013513680 A, KR 20120032668 A, and KR 20180076645 A already submitted.).

* cited by examiner

*Primary Examiner* — Kregg T Brooks
(74) *Attorney, Agent, or Firm* — Morgan, Lewis & Bockius LLP

(57) ABSTRACT

The present disclosure relates to a method of preparing a polymer, which includes: adding an alkyl-substituted aromatic vinyl-based monomer and a vinyl cyanide-based monomer to a reactor and initiating polymerization; and performing polymerization while continuously adding an alkyl-substituted aromatic vinyl-based monomer and a multifunctional initiator to the reactor, wherein the continuous addition of the alkyl-substituted aromatic vinyl-based monomer and the multifunctional initiator is initiated when a polymerization conversion rate is 10 to 30%, and the continuous addition of the alkyl-substituted aromatic vinyl-based monomer and the multifunctional initiator is terminated when a polymerization conversion rate is 70 to 80%.

11 Claims, No Drawings

METHOD OF PREPARING POLYMER

CROSS-REFERENCE TO RELATED APPLICATIONS

This application claims priority to and the benefit of Korean Patent Application No. 10-2022-0006608, filed on Jan. 17, 2022, and Korean Patent Application No. 10-2023-0006115, filed on Jan. 16, 2023, the disclosures of which are incorporated herein by reference in their entireties.

TECHNICAL FIELD

Technical Field

The present invention relates to a method of preparing a polymer, and specifically, to a method of preparing a polymer whose mechanical properties and processability are improved by allowing a molecular weight distribution to be broadened while maintaining an appropriate level of weight-average molecular weight.

Background Art

Polymers including vinyl cyanide-based monomer units and aromatic vinyl-based monomer units may be prepared by one or more methods selected from the group consisting of bulk polymerization, suspension polymerization, and emulsion polymerization. Among these methods, bulk polymerization has advantages such as high yield because continuous polymerization is possible and high purity because an additive is not added. However, the bulk polymerization has disadvantages such as a low degree of polymerization because the viscosity of a polymerization solution is high in the reaction and a difficulty in controlling the heat of reaction. In order to solve the disadvantages of bulk polymerization, a method of preparing a polymer by suspension polymerization has been proposed.

Meanwhile, to increase heat resistance, there has been proposed a method of preparing a heat-resistant polymer by introducing an aromatic vinyl-based monomer unit, especially, an alkyl-substituted aromatic vinyl-based monomer unit, as a component into a polymer. However, the heat-resistant polymer does not exhibit excellent processability due to having a high glass transition temperature. The processability of the heat-resistant polymer is related to a melt flow index, and to increase a melt flow index, the heat-resistant polymer needs to be used in a mixed state with a lubricant, or the weight-average molecular weight of the heat-resistant polymer needs to be decreased. However, the use of a large amount of lubricant and the low weight-average molecular weight cause degradation of heat resistance and chemical resistance of the heat-resistant polymer.

RELATED ART DOCUMENTS

Patent Documents (Patent Document 1) KR1646311B

DISCLOSURE

Technical Problem

The present invention is directed to providing a method of preparing a polymer whose mechanical properties and processability are improved by allowing a molecular weight distribution to be broadened while maintaining an appropriate level of weight-average molecular weight.

Technical Solution (1) One aspect of the present invention provides a method of preparing a polymer, which includes: adding an alkyl-substituted aromatic vinyl-based monomer and a vinyl cyanide-based monomer to a reactor and initiating polymerization; and performing polymerization while continuously adding the alkyl-substituted aromatic vinyl-based monomer and a multifunctional initiator to the reactor, wherein the continuous addition of the alkyl-substituted aromatic vinyl-based monomer and the multifunctional initiator is initiated when a polymerization conversion rate is 10 to 30%, and the continuous addition of the alkyl-substituted aromatic vinyl-based monomer and the multifunctional initiator is terminated when a polymerization conversion rate is 70 to 80%.

(2) According to (1), the present invention provides a method of preparing a polymer in which the continuous addition of the alkyl-substituted aromatic vinyl-based monomer and the multifunctional initiator is initiated when a polymerization conversion rate is 15 to 25%.

(3) According to (1) or (2), the present invention provides a method of preparing a polymer in which the continuous addition of the alkyl-substituted aromatic vinyl-based monomer and the multifunctional initiator is terminated when a polymerization conversion rate is 70 to 75%.

(4) According to any one of (1) to (3), the present invention provides a method of preparing a polymer in which the alkyl-substituted aromatic vinyl-based monomer and the multifunctional initiator are continuously added in a mixed state.

(5) According to any one of (1) to (4), the present invention provides a method of preparing a polymer in which an amount of the continuously added alkyl-substituted aromatic vinyl-based monomer is 10 to 30 parts by weight with respect to 100 parts by weight of a total amount of monomers added in the method of preparing a polymer.

(6) According to any one of (1) to (5), the present invention provides a method of preparing a polymer in which an amount of the continuously added multifunctional initiator is 0.1 to 0.5 parts by weight with respect to 100 parts by weight of a total amount of monomers added in the method of preparing a polymer.

(7) According to any one of (1) to (6), the present invention provides a method of preparing a polymer in which a multifunctional initiator is added in the initiation of polymerization.

(8) According to any one of (1) to (7), the present invention provides a method of preparing a polymer in which a total amount of the multifunctional initiator added in the method of preparing a polymer is 0.4 to 0.8 parts by weight with respect to 100 parts by weight of a total amount of monomers added in the method of preparing a polymer.

(9) According to any one of (1) to (8), the present invention provides a method of preparing a polymer in which the multifunctional initiator is one or more selected from the group consisting of 2,2-di(4,4-di(t-butylperoxy)cyclohexyl)propane, 1,1-di(t-butylperoxy)cyclohexane, 1,1-di(t-amylperoxy)cyclohexane, 1,1-di(t-butylperoxy)-3,3,5-trimethylcyclohexane, and polyether poly(t-butyl peroxy carbonate).

(10) According to any one of (1) to (9), the present invention provides a method of preparing a polymer in which the polymerization is suspension polymerization.

Advantageous Effects

Since a polymer according to a preparation method of the present invention implements a broad molecular weight distribution while maintaining an appropriate level of weight-average molecular weight, mechanical properties can be excellent, and processability can be substantially improved.

MODES OF THE INVENTION

Hereinafter, the present invention will be described in further detail to help in understanding the present invention.

Terms and words used in this specification and claims should not be interpreted as being limited to commonly used meanings or meanings in dictionaries, and, based on the principle that the inventors can appropriately define concepts of terms in order to describe their invention in the best way, the terms and words should be interpreted with meanings and concepts which are consistent with the technical spirit of the present invention.

As used herein, the term "polymerization conversion rate" refers to the degree of formation of a polymer by polymerization of monomers and may be calculated by the following equation.

$$\text{Polymerization conversion rate (\%)}=[(\text{Total weight of monomers added until polymerization is terminated})-(\text{Total weight of unreacted monomers when polymerization conversion rate is measured})]/(\text{Total weight of monomers added until polymerization is terminated})\times100$$

As used herein, the term "vinyl cyanide-based monomer" may be one or more selected from the group consisting of acrylonitrile, methacrylonitrile, 2-ethyl-acrylonitrile, and 2-chloroacrylonitrile. As the vinyl cyanide-based monomer, acrylonitrile is preferred. A unit derived from the vinyl cyanide-based monomer may be a vinyl cyanide-based monomer unit.

As used herein, the term "alkyl-substituted aromatic vinyl-based monomer" may be one or more selected from the group consisting of α-methyl styrene, p-methyl styrene, and 2,4-dimethyl styrene. As the aromatic vinyl-based monomer, α-methyl styrene is preferred. A unit derived from the alkyl-substituted aromatic vinyl-based monomer may be an alkyl-substituted aromatic vinyl-based monomer unit.

As used herein, the term "aqueous solvent" may be ion-exchanged water or deionized water.

As used herein, the term "suspending agent" may be one or more selected from the group consisting of water-soluble polyvinyl alcohol, partially hydrolyzed polyvinyl alcohol, polyacrylic acid, a polymer of vinyl acetate and maleic anhydride, hydroxypropyl methylcellulose, gelatin, calcium phosphate, tricalcium phosphate, hydroxyapatite, sorbitan monolaurate, sorbitan trioleate, polyoxyethylene, sodium lauryl sulfate, sodium dodecylbenzene sulfonate, and dioctyl sodium sulfosuccinate. As the suspending agent, tricalcium phosphate is preferred.

1. Method of Preparing Polymer

A method of preparing a polymer according to an embodiment of the present invention includes: adding an alkyl-substituted aromatic vinyl-based monomer and a vinyl cyanide-based monomer to a reactor and initiating polymerization; and performing polymerization while continuously adding the alkyl-substituted aromatic vinyl-based monomer and a multifunctional initiator to the reactor, wherein the continuous addition of the alkyl-substituted aromatic vinyl-based monomer and the multifunctional initiator is initiated when a polymerization conversion rate is 10 to 30%, and the continuous addition of the alkyl-substituted aromatic vinyl-based monomer and the multifunctional initiator is terminated when a polymerization conversion rate is 70 to 80%.

Hereinafter, the method of preparing a polymer according to an embodiment of the present invention will be described in detail.

1) Initiation of Polymerization

First, an alkyl-substituted aromatic vinyl-based monomer and a vinyl cyanide-based monomer are added to a reactor, and polymerization is initiated.

When an alkyl-substituted aromatic vinyl-based monomer and a vinyl cyanide-based monomer are added before the initiation of polymerization, the alkyl-substituted aromatic vinyl-based monomer is polymerized together during polymerization, and thus the polymerization conversion rate of the alkyl-substituted aromatic vinyl-based monomer can be enhanced at an early stage of polymerization.

A total amount of monomers added before the initiation of polymerization may be 70 to 90 parts by weight, and preferably 75 to 85 parts by weight with respect to 100 parts by weight of a total amount of monomers added in the method of preparing a polymer. When the above-described condition is satisfied, a polymer having a uniform composition, excellent color characteristics, and improved mechanical properties due to a high weight-average molecular weight can be prepared.

An amount of the alkyl-substituted aromatic vinyl-based monomer added before the initiation of polymerization may be 50 to 75 parts by weight, and preferably 55 to 70 parts by weight with respect to 100 parts by weight of a total amount of monomers added before the initiation of polymerization. Also, an amount of the vinyl cyanide-based monomer added before the initiation of polymerization may be 25 to 50 parts by weight, and preferably 30 to 45 parts by weight with respect to a total amount of monomers added before the initiation of polymerization. When the above-described conditions are satisfied, a polymer having a uniform composition, excellent color characteristics, and improved mechanical properties due to a high weight-average molecular weight can be prepared. Also, a final polymerization conversion rate is increased, and thus preparation efficiency can be improved.

The polymerization is preferably suspension polymerization which is easily controlled by using an aqueous solvent as a medium, has high yield, and includes a simple washing process.

The suspension polymerization may be initiated in the presence of an initiator, a suspending agent, and a suspending aid. Also, the initiator, the suspending agent, and the suspending aid may be added before the initiation of polymerization.

The initiator may be one or more selected from the group consisting of 2,5-dimethyl-2,5-di(t-butylperoxy) hexane, di(t-butylperoxy-isopropyl)benzene, t-butyl cumyl peroxide, di-(t-amyl)-peroxide, dicumyl peroxide, butyl 4,4-di(t-butylperoxy) valerate, t-butylperoxybenzoate, 2,2-di(t-butylperoxy) butane, t-amylperoxy-benzoate, t-butylperoxy-acetate, t-butylperoxy-(2-ethylhexyl)carbonate, t-butylperoxy isopropyl carbonate, t-butylperoxy-3,5,5-trimethyl-hexanoate, t-amylperoxyacetate, t-amylperoxy-(2-ethylhexyl)carbonate, 1,1-di(t-butylperoxy)-3,3,5-trimethylcyclohexane, 1,1-di(t-amylperoxy)cyclohexane, t-butylmonoperoxy-maleate, 1,1'-azodi(hexahydrobenzonitrile), 2,2-di(4,4-di(t-butylperoxy)cyclohexyl)propane, 1,1-di(t-butylperoxy)cyclohexane, and polyether poly(t-butyl peroxy carbonate). Among those listed above, one or more selected from the group consisting of 2,2-di(4,4-di(t-butylperoxy)cyclohexyl)propane, 1,1-di(t-butylperoxy)cyclohexane, 1,1-di(t-amylperoxy)cyclohexane, 1,1-di(t-butylperoxy)-3,3,5-trimethylcyclohexane, and polyether poly(t-butyl peroxy carbonate), which are multifunctional initiators capable of improving a polymerization rate at a relatively low temperature, are preferably used.

An amount of the initiator may be 0.1 to 0.5 parts by weight, and preferably 0.2 to 0.4 parts by weight with respect to 100 parts by weight of a total amount of monomers added in the method of preparing a polymer. When the above-described condition is satisfied, the final polymerization conversion rate of a polymer can be increased, and a polymerization rate can be easily controlled. Also, the color characteristics and weight-average molecular weight of a polymer can be prevented from being degraded.

The suspending agent may be present in an amount of 0.7 to 2.0 parts by weight, and preferably 1.0 to 1.5 parts by weight with respect to 100 parts by weight of a total amount of monomers added in the method of preparing a polymer. When the above-described condition is satisfied, the average particle diameter of a polymer can be controlled to a desired diameter, and dispersion stability can be improved.

A weight ratio of the suspending agent and the suspending aid may be 200:1 to 300:1, and preferably 220:1 to 280:1. When the above-described condition is satisfied, the average particle diameter of a polymer can be controlled to a desired diameter, and dispersion stability can be improved.

2) Performance of Polymerization

Next, polymerization is performed while continuously adding the alkyl-substituted aromatic vinyl-based monomer and a multifunctional initiator to the reactor.

When polymerization is performed while continuously adding the alkyl-substituted aromatic vinyl-based monomer and the multifunctional initiator, a polymer having a high final polymerization conversion rate and substantially improved processability due to having an appropriate weight-average molecular weight and a broad molecular weight distribution can be prepared.

When the alkyl-substituted aromatic vinyl-based monomer is continuously added and the multifunctional initiator is not continuously added, the weight-average molecular weight of a polymer is decreased, and thus mechanical properties, particularly, impact resistance may be degraded. Also, when an initiator other than a multifunctional initiator is added, the color characteristics of a polymer are degraded, and the molecular weight distribution is narrowed, and thus a polymer having improved processability may not be prepared.

In addition, since the multifunctional initiator is added in a small amount in polymerization compared to the monomer, it may not be easy to continuously add the multifunctional initiator alone. Therefore, for process convenience, it is preferable that the alkyl-substituted aromatic vinyl-based monomer and the multifunctional initiator are continuously added in a mixed state.

Additionally, when the alkyl-substituted aromatic vinyl-based monomer is batch-added before the initiation of polymerization and not continuously added after the initiation of polymerization even though the multifunctional initiator is continuously added, an excessive amount of the alkyl-substituted aromatic vinyl-based monomer having a low polymerization rate is present at an early stage of polymerization, and thus a polymerization rate is substantially decreased, and the polymerization conversion rate of the alkyl-substituted aromatic vinyl-based monomer at an early stage of polymerization is substantially decreased. As a result, a polymer having a non-uniform composition throughout polymerization and degraded color characteristics may be prepared. Also, the alkyl-substituted aromatic vinyl-based monomer may react with the vinyl cyanide-based monomer and the like too late at the late stage of polymerization, and thus an excessive amount of oligomer may be produced.

However, when the alkyl-substituted aromatic vinyl-based monomer is continuously added, the alkyl-substituted aromatic vinyl-based monomer may be polymerized at an early stage of polymerization, and thus degradation of polymer color, which is caused by reaction of an excessive amount of the vinyl cyanide-based monomer at an early stage of polymerization, may be prevented.

In addition, the vinyl cyanide-based monomer is not continuously added and preferably batch-added before the initiation of polymerization to prevent polymerization of a large amount thereof at the late stage of polymerization.

Meanwhile, the continuous addition of the alkyl-substituted aromatic vinyl-based monomer and the multifunctional initiator may be initiated when a polymerization conversion rate is 10 to 30%, and preferably when a polymerization conversion rate is 15 to 25%. When the above-described condition is satisfied, a polymer having a uniform composition, improved color characteristics, and improved mechanical properties can be prepared. However, when the continuous addition is initiated earlier than the above-described time point, the weight-average molecular weight of a polymer is decreased, and thus mechanical properties may be degraded. Also, when the continuous addition is initiated later than the above-described time point, continuously added monomers are not mixed in a reaction system, and thus the transparency of a polymer is degraded, and a polymerization conversion rate is decreased. Accordingly, preparation efficiency may be degraded.

The continuous addition of the alkyl-substituted aromatic vinyl-based monomer and the multifunctional initiator may be terminated when a polymerization conversion rate is 70 to 80%, and preferably when a polymerization conversion rate is 70 to 75%. When the above-described condition is satisfied, a polymer having a high final polymerization conversion rate and substantially improved processability due to having an appropriate weight-average molecular weight and a broad molecular weight distribution can be prepared. However, when the continuous addition is terminated earlier than the above-described time point, an effect resulting from the continuous addition of monomers is degraded. Also, when the continuous addition is terminated later than the above-described time point, monomers do not penetrate into a polymer, and thus a polymer having a non-uniform composition is prepared. Accordingly, the transparency of a polymer is degraded.

Since an amount of the added multifunctional initiator is small, initiating the continuous addition of the multifunctional initiator when a polymerization conversion rate is 10 to 30% and terminating the continuous addition of the multifunctional initiator when a polymerization conversion rate is 70 to 80% without continuously adding the alkyl-substituted aromatic vinyl-based monomer is not possible. Specifically, since an amount of the added multifunctional initiator is small, it is difficult to satisfy the continuous addition condition of current polymerization equipment. For this reason, it is not possible to continuously add the multifunctional initiator alone at the above-described time point.

When the continuous addition of the alkyl-substituted aromatic vinyl-based monomer is initiated when a polymerization conversion rate is 10 to 30% and terminated when a polymerization conversion rate is 70 to 80% without the continuous addition of the multifunctional initiator, a polymerization rate is excessively increased, and thus the weight-average molecular weight of the obtained polymer is excessively decreased. As a result, the mechanical properties, such as impact resistance and the like, of the polymer are degraded.

An amount of the continuously added alkyl-substituted aromatic vinyl-based monomer may be 10 to 30 parts by weight, and preferably 15 to 25 parts by weight with respect to 100 parts by weight of a total amount of monomers added in the method of preparing a polymer. When the above-described condition is satisfied, a polymer whose color characteristics and weight-average molecular weight are improved can be prepared, and preparation efficiency can also be improved due to a high final polymerization conversion rate.

An amount of the continuously added multifunctional initiator may be 0.1 to 0.5 parts by weight, and preferably 0.2 to 0.4 parts by weight with respect to 100 parts by weight of a total amount of monomers added in the method of preparing a polymer. When the above-described condition is satisfied, a polymer whose weight-average molecular weight and color characteristics are improved can be prepared.

A total amount of the multifunctional initiator added in the method of preparing a polymer may be 0.4 to 0.8 parts by weight, and preferably 0.5 to 0.7 parts by weight with respect to 100 parts by weight of a total amount of monomers added in the method of preparing a polymer. When the above-described condition is satisfied, a polymer whose color characteristics and weight-average molecular weight are improved can be prepared, and preparation efficiency can also be improved due to a high final polymerization conversion rate.

The multifunctional initiator may be one or more selected from the group consisting of 2,2-di(4,4-di(t-butylperoxy) cyclohexyl)propane, 1,1-di(t-butylperoxy)cyclohexane, 1,1-di(t-amylperoxy)cyclohexane, 1,1-di(t-butylperoxy)-3,3,5-trimethylcyclohexane, and polyether poly(t-butyl peroxy carbonate).

3) Termination of Polymerization

After the step 2), the polymerization may be terminated when a polymerization conversion rate is 95% or more.

When the polymerization is terminated at the above-described time point, polymerization and aging processes may be further performed after the continuous addition of the alkyl-substituted aromatic vinyl-based monomer is terminated. Accordingly, the alkyl-substituted aromatic vinyl-based monomer continuously added relatively late can sufficiently participate in polymerization to suppress production of oligomers, and a polymer having a uniform composition throughout polymerization can be prepared.

Hereinafter, examples of the present invention will be described in detail so that those of ordinary skill in the art can easily carry out the present invention. However, it should be understood that the present invention can be implemented in various forms, and that the examples are not intended to limit the present invention.

8

EXAMPLE 1

<Preparation of First Reaction Solution>

50 parts by weight of α-methyl styrene (AMS), 30 parts by weight of acrylonitrile (AN), 150 parts by weight of ion-exchanged water, 0.2 parts by weight of an initiator (2,2-di(4,4-di(t-butylperoxy)cyclohexyl)propane), 1.3 parts by weight of a suspending agent (tricalcium phosphate), and 0.005 parts by weight of a suspending aid (RS-710 commercially available from TOHO Chemical Industry Co., Ltd.) were homogeneously mixed to prepare a first reaction solution.

<Preparation of Second Reaction Solution>

20 parts by weight of α-methyl styrene (AMS) and 0.4 parts by weight of an initiator (2,2-di(4,4-di(t-butylperoxy) cyclohexyl)propane) were homogeneously mixed to prepare a second reaction solution.

<Preparation of Polymer>

The entire amount of the first reaction solution was added to a reactor, and the temperature inside the reactor was raised to 100° C. to initiate polymerization. After the initiation of polymerization, polymerization was performed while continuously adding the entire amount of the second reaction solution at a constant rate from the time point where a polymerization conversion rate reached 10% to the time point where the polymerization conversion rate reached 75%. In this case, the time taken for a polymerization conversion rate to reach 10% after the initiation of polymerization was 60 minutes, and the continuous addition time of the second reaction solution was 420 minutes.

After the continuous addition of the second reaction solution was terminated, polymerization was performed while raising the temperature inside the reactor to 105° C. at a constant rate for 20 minutes, performed for 220 minutes while maintaining the temperature inside the reactor at 105° C., and terminated to obtain a polymerization slurry.

Formic acid was added to the reactor so that the polymerization slurry had a pH of 2.5, and the resulting polymerization slurry was washed, dehydrated, and dried to prepare a bead-type polymer.

EXAMPLE 2

The entire amount of the first reaction solution of Example 1 was added to a reactor, and the temperature inside the reactor was raised to 100° C. to initiate polymerization. After the initiation of polymerization, polymerization was performed while continuously adding the entire amount of the second reaction solution of Example 1 at a constant rate from the time point where a polymerization conversion rate reached 20% to the time point where the polymerization conversion rate reached 75%. In this case, the time taken for a polymerization conversion rate to reach 20% after the initiation of polymerization was 120 minutes, and the continuous addition time of the second reaction solution was 360 minutes.

After the continuous addition of the second reaction solution of Example 1 was terminated, polymerization was performed while raising the temperature inside the reactor to 105° C. at a constant rate for 20 minutes, performed for 220 minutes while maintaining the temperature inside the reactor at 105° C., and terminated to obtain a polymerization slurry.

Formic acid was added to the reactor so that the polymerization slurry had a pH of 2.5, and the resulting polymerization slurry was washed, dehydrated, and dried to prepare a bead-type polymer.

EXAMPLE 3

The entire amount of the first reaction solution of Example 1 was added to a reactor, and the temperature inside the reactor was raised to 100° C. to initiate polymerization. After the initiation of polymerization, polymerization was performed while continuously adding the entire amount of the second reaction solution of Example 1 at a constant rate from the time point where a polymerization conversion rate reached 30% to the time point where the polymerization conversion rate reached 75%. In this case, the time taken for a polymerization conversion rate to reach 30% after the initiation of polymerization was 180 minutes, and the continuous addition time of the second reaction solution was 300 minutes.

After the continuous addition of the second reaction solution of Example 1 was terminated, polymerization was performed while raising the temperature inside the reactor to 105° C. at a constant rate for 20 minutes, performed for 220 minutes while maintaining the temperature inside the reactor at 105° C., and terminated to obtain a polymerization slurry.

Formic acid was added to the reactor so that the polymerization slurry had a pH of 2.5, and the resulting polymerization slurry was washed, dehydrated, and dried to prepare a bead-type polymer.

EXAMPLE 4

The entire amount of the first reaction solution of Example 1 was added to a reactor, and the temperature inside the reactor was raised to 100° C. to initiate polymerization. After the initiation of polymerization, polymerization was performed while continuously adding the entire amount of the second reaction solution of Example 1 at a constant rate from the time point where a polymerization conversion rate reached 20% to the time point where the polymerization conversion rate reached 70%. In this case, the time taken for a polymerization conversion rate to reach 20% after the initiation of polymerization was 120 minutes, and the continuous addition time of the second reaction solution was 300 minutes.

After the continuous addition of the second reaction solution of Example 1 was terminated, polymerization was performed while maintaining the temperature inside the reactor at 100° C. for 60 minutes and then raising the temperature inside the reactor to 105° C. at a constant rate for 20 minutes, performed for 220 minutes while maintaining the temperature inside the reactor at 105° C., and terminated to obtain a polymerization slurry.

Formic acid was added to the reactor so that the polymerization slurry had a pH of 2.5, and the resulting polymerization slurry was washed, dehydrated, and dried to prepare a bead-type polymer.

EXAMPLE 5

The entire amount of the first reaction solution of Example 1 was added to a reactor, and the temperature inside the reactor was raised to 100° C. to initiate polymerization. After the initiation of polymerization, polymerization was performed while continuously adding the entire amount of the second reaction solution of Example 1 at a constant rate from the time point where a polymerization conversion rate reached 20% to the time point where the polymerization conversion rate reached 80%. In this case, the time taken for a polymerization conversion rate to reach 20% after the initiation of polymerization was 120 minutes, and the continuous addition time of the second reaction solution was 390 minutes.

After the continuous addition of the second reaction solution of Example 1 was terminated, polymerization was performed while raising the temperature inside the reactor to 105° C. at a constant rate for 20 minutes, performed for 190 minutes while maintaining the temperature inside the reactor at 105° C., and terminated to obtain a polymerization slurry.

Formic acid was added to the reactor so that the polymerization slurry had a pH of 2.5, and the resulting polymerization slurry was washed, dehydrated, and dried to prepare a bead-type polymer.

EXAMPLE 6

<Preparation of First Reaction Solution>

50 parts by weight of α-methyl styrene (AMS), 30 parts by weight of acrylonitrile (AN), 150 parts by weight of ion-exchanged water, 0.4 parts by weight of an initiator (2,2-di(4,4-di(t-butylperoxy)cyclohexyl)propane), 1.3 parts by weight of a suspending agent (tricalcium phosphate), and 0.005 parts by weight of a suspending aid (RS-710 commercially available from TOHO Chemical Industry Co., Ltd.) were homogeneously mixed to prepare a first reaction solution.

<Preparation of Second Reaction Solution>

20 parts by weight of α-methyl styrene (AMS) and 0.2 parts by weight of an initiator (2,2-di(4,4-di(t-butylperoxy) cyclohexyl)propane) were homogeneously mixed to prepare a second reaction solution.

<Preparation of Polymer>

The entire amount of the first reaction solution was added to a reactor, and the temperature inside the reactor was raised to 100° C. to initiate polymerization. After the initiation of polymerization, polymerization was performed while continuously adding the entire amount of the second reaction solution at a constant rate from the time point where a polymerization conversion rate reached 20% to the time point where the polymerization conversion rate reached 75%. In this case, the time taken for a polymerization conversion rate to reach 20% after the initiation of polymerization was 90 minutes, and the continuous addition time of the second reaction solution was 390 minutes.

After the continuous addition of the second reaction solution was terminated, polymerization was performed while raising the temperature inside the reactor to 105° C. at a constant rate for 20 minutes, performed for 220 minutes while maintaining the temperature inside the reactor at 105° C., and terminated to obtain a polymerization slurry.

Formic acid was added to the reactor so that the polymerization slurry had a pH of 2.5, and the resulting polymerization slurry was washed, dehydrated, and dried to prepare a bead-type polymer.

EXAMPLE 7

<Preparation of First Reaction Solution>

50 parts by weight of α-methyl styrene (AMS), 30 parts by weight of acrylonitrile (AN), 150 parts by weight of ion-exchanged water, 0.4 parts by weight of an initiator (2,2-di(4,4-di(t-butylperoxy)cyclohexyl)propane), 1.3 parts by weight of a suspending agent (tricalcium phosphate), and 0.005 parts by weight of a suspending aid (RS-710 commercially available from TOHO Chemical Industry Co., Ltd.) were homogeneously mixed to prepare a first reaction solution.

<Preparation of Second Reaction Solution>

20 parts by weight of α-methyl styrene (AMS) and 0.2 parts by weight of an initiator (polyether poly(t-butyl peroxy carbonate)) were homogeneously mixed to prepare a second reaction solution.

<Preparation of Polymer>

The entire amount of the first reaction solution was added to a reactor, and the temperature inside the reactor was raised to 100° C. to initiate polymerization. After the initiation of polymerization, polymerization was performed while continuously adding the entire amount of the second reaction solution at a constant rate from the time point where a polymerization conversion rate reached 20% to the time point where the polymerization conversion rate reached 75%. In this case, the time taken for a polymerization conversion rate to reach 20% after the initiation of polymerization was 90 minutes, and the continuous addition time of the second reaction solution was 390 minutes.

After the continuous addition of the second reaction solution was terminated, polymerization was performed while raising the temperature inside the reactor to 110° C. at a constant rate for 20 minutes, performed for 220 minutes while maintaining the temperature inside the reactor at 110° C., and terminated to obtain a polymerization slurry.

Formic acid was added to the reactor so that the polymerization slurry had a pH of 2.5, and the resulting polymerization slurry was washed, dehydrated, and dried to prepare a bead-type polymer.

EXAMPLE 8

<Preparation of First Reaction Solution>

50 parts by weight of α-methyl styrene (AMS), 30 parts by weight of acrylonitrile (AN), 150 parts by weight of ion-exchanged water, 0.2 parts by weight of an initiator (1,1-di(t-butylperoxy)cyclohexane), 1.3 parts by weight of a suspending agent (tricalcium phosphate), and 0.005 parts by weight of a suspending aid (RS-710 commercially available from TOHO Chemical Industry Co., Ltd.) were homogeneously mixed to prepare a first reaction solution.

<Preparation of Second Reaction Solution>

20 parts by weight of α-methyl styrene (AMS) and 0.4 parts by weight of an initiator (1,1-di(t-butylperoxy)cyclohexane) were homogeneously mixed to prepare a second reaction solution.

<Preparation of Polymer>

The entire amount of the first reaction solution was added to a reactor, and the temperature inside the reactor was raised to 95° C. to initiate polymerization. After the initiation of polymerization, polymerization was performed while continuously adding the entire amount of the second reaction solution at a constant rate from the time point where a polymerization conversion rate reached 20% to the time point where the polymerization conversion rate reached 75%. In this case, the time taken for a polymerization conversion rate to reach 20% after the initiation of polymerization was 120 minutes, and the continuous addition time of the second reaction solution was 360 minutes.

After the continuous addition of the second reaction solution was terminated, polymerization was performed while raising the temperature inside the reactor to 100° C. at a constant rate for 20 minutes, performed for 220 minutes while maintaining the temperature inside the reactor at 100° C., and terminated to obtain a polymerization slurry.

Formic acid was added to the reactor so that the polymerization slurry had a pH of 2.5, and the resulting polymerization slurry was washed, dehydrated, and dried to prepare a bead-type polymer.

EXAMPLE 9

<Preparation of First Reaction Solution>

50 parts by weight of α-methyl styrene (AMS), 30 parts by weight of acrylonitrile (AN), 150 parts by weight of ion-exchanged water, 0.4 parts by weight of an initiator (1,1-di(t-butylperoxy)cyclohexane), 1.3 parts by weight of a suspending agent (tricalcium phosphate), and 0.005 parts by weight of a suspending aid (RS-710 commercially available from TOHO Chemical Industry Co., Ltd.) were homogeneously mixed to prepare a first reaction solution.

<Preparation of Second Reaction Solution>

20 parts by weight of α-methyl styrene (AMS) and 0.2 parts by weight of an initiator (1,1-di(t-butylperoxy)cyclohexane) were homogeneously mixed to prepare a second reaction solution.

<Preparation of Polymer>

The entire amount of the first reaction solution was added to a reactor, and the temperature inside the reactor was raised to 95° C. to initiate polymerization. After the initiation of polymerization, polymerization was performed while continuously adding the entire amount of the second reaction solution at a constant rate from the time point where a polymerization conversion rate reached 20% to the time point where the polymerization conversion rate reached 75%. In this case, the time taken for a polymerization conversion rate to reach 20% after the initiation of polymerization was 90 minutes, and the continuous addition time of the second reaction solution was 390 minutes.

After the continuous addition of the second reaction solution was terminated, polymerization was performed while raising the temperature inside the reactor to 100° C. at a constant rate for 20 minutes, performed for 220 minutes while maintaining the temperature inside the reactor at 100° C., and terminated to obtain a polymerization slurry.

Formic acid was added to the reactor so that the polymerization slurry had a pH of 2.5, and the resulting polymerization slurry was washed, dehydrated, and dried to prepare a bead-type polymer.

Comparative Example 1

The entire amount of the first reaction solution of Example 1 was added to a reactor, and the temperature inside the reactor was raised to 100° C. to initiate polymerization. After the initiation of polymerization, polymerization was performed while continuously adding the entire amount of the second reaction solution of Example 1 at a constant rate from the time point where a polymerization conversion rate reached 7% to the time point where the polymerization conversion rate reached 75%. In this case, the time taken for a polymerization conversion rate to reach 7% after the initiation of polymerization was 30 minutes, and the continuous addition time of the second reaction solution was 450 minutes.

After the continuous addition of the second reaction solution of Example 1 was terminated, polymerization was performed while raising the temperature inside the reactor to 105° C. at a constant rate for 20 minutes, performed for 220 minutes while maintaining the temperature inside the reactor at 105° C., and terminated to obtain a polymerization slurry.

Formic acid was added to the reactor so that the polymerization slurry had a pH of 2.5, and the resulting polymerization slurry was washed, dehydrated, and dried to prepare a bead-type polymer.

Comparative Example 2

The entire amount of the first reaction solution of Example 1 was added to a reactor, and the temperature inside the reactor was raised to 100° C. to initiate polymerization. After the initiation of polymerization, polymerization was performed while continuously adding the entire amount of the second reaction solution of Example 1 at a constant rate from the time point where a polymerization conversion rate reached 34% to the time point where the polymerization conversion rate reached 75%. In this case, the time taken for a polymerization conversion rate to reach 34% after the initiation of polymerization was 200 minutes, and the continuous addition time of the second reaction solution was 280 minutes.

After the continuous addition of the second reaction solution of Example 1 was terminated, polymerization was performed while raising the temperature inside the reactor to 105° C. at a constant rate for 20 minutes, performed for 220 minutes while maintaining the temperature inside the reactor at 105° C., and terminated to obtain a polymerization slurry. Formic acid was added to the reactor so that the polymerization slurry had a pH of 2.5, and the resulting polymerization slurry was washed, dehydrated, and dried to prepare a bead-type polymer.

Comparative Example 3

The entire amount of the first reaction solution of Example 1 was added to a reactor, and the temperature inside the reactor was raised to 100° C. to initiate polymerization. After the initiation of polymerization, polymerization was performed while continuously adding the entire amount of the second reaction solution of Example 1 at a constant rate from the time point where a polymerization conversion rate reached 20% to the time point where the polymerization conversion rate reached 66%. In this case, the time taken for a polymerization conversion rate to reach 20% after the initiation of polymerization was 120 minutes, and the continuous addition time of the second reaction solution was 270 minutes.

After the continuous addition of the second reaction solution of Example 1 was terminated, polymerization was performed while maintaining the temperature inside the reactor at 100° C. for 90 minutes and then raising the temperature inside the reactor to 105° C. at a constant rate for 20 minutes, performed for 220 minutes while maintaining the temperature inside the reactor at 105° C., and terminated to obtain a polymerization slurry. Formic acid was added to the reactor so that the polymerization slurry had a pH of 2.5, and the resulting polymerization slurry was washed, dehydrated, and dried to prepare a bead-type polymer.

Comparative Example 4

The entire amount of the first reaction solution of Example 1 was added to a reactor, and the temperature inside the reactor was raised to 100° C. to initiate polymerization. After the initiation of polymerization, polymerization was performed while continuously adding the entire amount of the second reaction solution of Example 1 at a constant rate from the time point where a polymerization conversion rate reached 20% to the time point where the polymerization conversion rate reached 83%. In this case, the time taken for a polymerization conversion rate to reach 20% after the initiation of polymerization was 120 minutes, and the continuous addition time of the second reaction solution was 420 minutes.

After the continuous addition of the second reaction solution of Example 1 was terminated, polymerization was performed while raising the temperature inside the reactor to 105° C. at a constant rate for 20 minutes, performed for 160 minutes while maintaining the temperature inside the reactor at 105° C., and terminated to obtain a polymerization slurry. Formic acid was added to the reactor so that the polymerization slurry had a pH of 2.5, and the resulting polymerization slurry was washed, dehydrated, and dried to prepare a bead-type polymer.

Comparative Example 5

<Preparation of First Reaction Solution>
50 parts by weight of α-methyl styrene (AMS), 30 parts by weight of acrylonitrile (AN), 150 parts by weight of ion-exchanged water, 0.4 parts by weight of an initiator (2,2-di(4,4-di(t-butylperoxy)cyclohexyl)propane), 1.3 parts by weight of a suspending agent (tricalcium phosphate), and 0.005 parts by weight of a suspending aid (RS-710 commercially available from TOHO Chemical Industry Co., Ltd.) were homogeneously mixed to prepare a first reaction solution.
<Preparation of Second Reaction Solution>
20 parts by weight of α-methyl styrene (AMS) and 0.2 parts by weight of an initiator (t-butyl peroxybenzoate) were homogeneously mixed to prepare a second reaction solution.
<Preparation of Polymer>
The entire amount of the first reaction solution was added to a reactor, and the temperature inside the reactor was raised to 100° C. to initiate polymerization. After the initiation of polymerization, polymerization was performed while continuously adding the entire amount of the second reaction solution at a constant rate from the time point where a polymerization conversion rate reached 20% to the time point where the polymerization conversion rate reached 75%. In this case, the time taken for a polymerization conversion rate to reach 20% after the initiation of polymerization was 90 minutes, and the continuous addition time of the second reaction solution was 390 minutes.

After the continuous addition of the second reaction solution was terminated, polymerization was performed while raising the temperature inside the reactor to 110° C. at a constant rate for 20 minutes, performed for 220 minutes while maintaining the temperature inside the reactor at 110° C., and terminated to obtain a polymerization slurry. Formic acid was added to the reactor so that the polymerization slurry had a pH of 2.5, and the resulting polymerization slurry was washed, dehydrated, and dried to prepare a bead-type polymer.

Comparative Example 6

<Preparation of First Reaction Solution>
50 parts by weight of α-methyl styrene (AMS), 30 parts by weight of acrylonitrile (AN), 150 parts by weight of ion-exchanged water, 0.4 parts by weight of an initiator (2,2-di(4,4-di(t-butylperoxy)cyclohexyl)propane), 1.3 parts by weight of a suspending agent (tricalcium phosphate), and 0.005 parts by weight of a suspending aid (RS-710 commercially available from TOHO Chemical Industry Co., Ltd.) were homogeneously mixed to prepare a first reaction solution.

<Preparation of Second Reaction Solution>

20 parts by weight of α-methyl styrene (AMS) and 0.2 parts by weight of an initiator (dicumyl peroxide) were homogeneously mixed to prepare a second reaction solution.

<Preparation of Polymer>

The entire amount of the first reaction solution was added to a reactor, and the temperature inside the reactor was raised to 100° C. to initiate polymerization. After the initiation of polymerization, polymerization was performed while continuously adding the entire amount of the second reaction solution at a constant rate from the time point where a polymerization conversion rate reached 20% to the time point where the polymerization conversion rate reached 75%. In this case, the time taken for a polymerization conversion rate to reach 20% after the initiation of polymerization was 90 minutes, and the continuous addition time of the second reaction solution was 390 minutes.

After the continuous addition of the second reaction solution was terminated, polymerization was performed while raising the temperature inside the reactor to 130° C. at a constant rate for 40 minutes, performed for 200 minutes while maintaining the temperature inside the reactor at 130° C., and terminated to obtain a polymerization slurry.

Formic acid was added to the reactor so that the polymerization slurry had a pH of 2.5, and the resulting polymerization slurry was washed, dehydrated, and dried to prepare a bead-type polymer.

Comparative Example 7

<Preparation of First Reaction Solution>

50 parts by weight of α-methyl styrene (AMS), 30 parts by weight of acrylonitrile (AN), 150 parts by weight of ion-exchanged water, 0.4 parts by weight of an initiator (1,1-di(t-butylperoxy)cyclohexane), 1.3 parts by weight of a suspending agent (tricalcium phosphate), and 0.005 parts by weight of a suspending aid (RS-710 commercially available from TOHO Chemical Industry Co., Ltd.) were homogeneously mixed to prepare a first reaction solution.

<Preparation of Second Reaction Solution>

20 parts by weight of α-methyl styrene (AMS) and 0.2 parts by weight of an initiator (t-butyl peroxybenzoate) were homogeneously mixed to prepare a second reaction solution.

<Preparation of Polymer>

The entire amount of the first reaction solution was added to a reactor, and the temperature inside the reactor was raised to 95° C. to initiate polymerization. After the initiation of polymerization, polymerization was performed while continuously adding the entire amount of the second reaction solution at a constant rate from the time point where a polymerization conversion rate reached 20% to the time point where the polymerization conversion rate reached 75%. In this case, the time taken for a polymerization conversion rate to reach 20% after the initiation of polymerization was 90 minutes, and the continuous addition time of the second reaction solution was 390 minutes.

After the continuous addition of the second reaction solution was terminated, polymerization was performed while raising the temperature inside the reactor to 120° C. at a constant rate for 30 minutes, performed for 210 minutes while maintaining the temperature inside the reactor at 120° C., and terminated to obtain a polymerization slurry.

Formic acid was added to the reactor so that the polymerization slurry had a pH of 2.5, and the resulting polymerization slurry was washed, dehydrated, and dried to prepare a bead-type polymer.

Comparative Example 8

<Preparation of First Reaction Solution>

50 parts by weight of α-methyl styrene (AMS), 30 parts by weight of acrylonitrile (AN), 150 parts by weight of ion-exchanged water, 0.6 parts by weight of an initiator (2,2-di(4,4-di(t-butylperoxy)cyclohexyl)propane), 1.3 parts by weight of a suspending agent (tricalcium phosphate), and 0.005 parts by weight of a suspending aid (RS-710 commercially available from TOHO Chemical Industry Co., Ltd.) were homogeneously mixed to prepare a first reaction solution.

<Preparation of Polymer>

The entire amount of the first reaction solution was added to a reactor, and the temperature inside the reactor was raised to 100° C. to initiate polymerization. After the initiation of polymerization, polymerization was performed while continuously adding 20 parts by weight of α-methyl styrene (AMS) at a constant rate from the time point where a polymerization conversion rate reached 20% to the time point where the polymerization conversion rate reached 75%. In this case, the time taken for a polymerization conversion rate to reach 20% after the initiation of polymerization was 60 minutes, and the continuous addition time of α-methyl styrene was 420 minutes.

Polymerization was performed while raising the temperature inside the reactor to 110° C. at a constant rate for 20 minutes, performed for 220 minutes while maintaining the temperature inside the reactor at 110° C., and terminated to obtain a polymerization slurry.

Formic acid was added to the reactor so that the polymerization slurry had a pH of 2.5, and the resulting polymerization slurry was washed, dehydrated, and dried to prepare a bead-type polymer.

Comparative Example 9

<Preparation of First Reaction Solution>

50 parts by weight of α-methyl styrene (AMS), 30 parts by weight of acrylonitrile (AN), 150 parts by weight of ion-exchanged water, 0.6 parts by weight of an initiator (1,1-di(t-butylperoxy)cyclohexane), 1.3 parts by weight of a suspending agent (tricalcium phosphate), and 0.005 parts by weight of a suspending aid (RS-710 commercially available from TOHO Chemical Industry Co., Ltd.) were homogeneously mixed to prepare a first reaction solution.

<Preparation of Polymer>

The entire amount of the first reaction solution was added to a reactor, and the temperature inside the reactor was raised to 95° C. to initiate polymerization. After the initiation of polymerization, polymerization was performed while continuously adding 20 parts by weight of α-methyl styrene (AMS) at a constant rate from the time point where a polymerization conversion rate reached 20% to the time point where the polymerization conversion rate reached 75%. Polymerization was performed while continuously adding the entire amount of the second reaction solution at a constant rate. In this case, the time taken for a polymerization conversion rate to reach 20% after the initiation of polymerization was 120 minutes, and the continuous addition time of α-methyl styrene (AMS) was 360 minutes.

Polymerization was performed while raising the temperature inside the reactor to 100° C. at a constant rate for 20 minutes, performed for 220 minutes while maintaining the temperature inside the reactor at 100° C., and terminated to obtain a polymerization slurry.

Formic acid was added to the reactor so that the polymerization slurry had a pH of 2.5, and the resulting polymerization slurry was washed, dehydrated, and dried to prepare a bead-type polymer.

Comparative Example 10

<Preparation of First Reaction Solution>

50 parts by weight of α-methyl styrene (AMS), 30 parts by weight of acrylonitrile (AN), 150 parts by weight of ion-exchanged water, 0.6 parts by weight of an initiator (benzoyl peroxide), 1.3 parts by weight of a suspending agent (tricalcium phosphate), and 0.005 parts by weight of a suspending aid (RS-710 commercially available from TOHO Chemical Industry Co., Ltd.) were homogeneously mixed to prepare a first reaction solution.

<Preparation of Polymer>

The entire amount of the first reaction solution was added to a reactor, and the temperature inside the reactor was raised to 75° C. to initiate polymerization. After the initiation of polymerization, polymerization was performed while continuously adding 20 parts by weight of α-methyl styrene (AMS) at a constant rate from the time point where a polymerization conversion rate reached 20% to the time point where the polymerization conversion rate reached 60%. Polymerization was performed while continuously adding the entire amount of the second reaction solution at a constant rate. In this case, the time taken for a polymerization conversion rate to reach 20% after the initiation of polymerization was 120 minutes, and the continuous addition time of α-methyl styrene (AMS) was 360 minutes.

Polymerization was performed while raising the temperature inside the reactor to 90° C. at a constant rate for 20 minutes, performed for 220 minutes while maintaining the temperature inside the reactor at 90° C., and terminated to obtain a polymerization slurry.

Formic acid was added to the reactor so that the polymerization slurry had a pH of 2.5, and the resulting polymerization slurry was washed, dehydrated, and dried to prepare a bead-type polymer.

Comparative Example 11

<Preparation of First Reaction Solution>

50 parts by weight of α-methyl styrene (AMS), 30 parts by weight of acrylonitrile (AN), 150 parts by weight of ion-exchanged water, 0.6 parts by weight of an initiator (polyether poly(t-butyl peroxy carbonate)), 1.3 parts by weight of a suspending agent (tricalcium phosphate), and 0.005 parts by weight of a suspending aid (RS-710 commercially available from TOHO Chemical Industry Co., Ltd.) were homogeneously mixed to prepare a first reaction solution.

<Preparation of Polymer>

The entire amount of the first reaction solution was added to a reactor, and the temperature inside the reactor was raised to 105° C. to initiate polymerization. After the initiation of polymerization, polymerization was performed while continuously adding 20 parts by weight of α-methyl styrene (AMS) at a constant rate from the time point where a polymerization conversion rate reached 20% to the time point where the polymerization conversion rate reached 75%. Polymerization was performed while continuously adding the entire amount of the second reaction solution at a constant rate. In this case, the time taken for a polymerization conversion rate to reach 20% after the initiation of polymerization was 120 minutes, and the continuous addition time of α-methyl styrene (AMS) was 360 minutes.

Polymerization was performed while raising the temperature inside the reactor to 110° C. at a constant rate for 20 minutes, performed for 220 minutes while maintaining the temperature inside the reactor at 110° C., and terminated to obtain a polymerization slurry.

Formic acid was added to the reactor so that the polymerization slurry had a pH of 2.5, and the resulting polymerization slurry was washed, dehydrated, and dried to prepare a bead-type polymer.

Comparative Example 12

<Preparation of First Reaction Solution>

50 parts by weight of α-methyl styrene (AMS), 30 parts by weight of acrylonitrile (AN), 150 parts by weight of ion-exchanged water, 0.6 parts by weight of an initiator (t-butyl peroxybenzoate), 1.3 parts by weight of a suspending agent (tricalcium phosphate), and 0.005 parts by weight of a suspending aid (RS-710 commercially available from TOHO Chemical Industry Co., Ltd.) were homogeneously mixed to prepare a first reaction solution.

<Preparation of Polymer>

The entire amount of the first reaction solution was added to a reactor, and the temperature inside the reactor was raised to 110° C. to initiate polymerization. After the initiation of polymerization, polymerization was performed while continuously adding 20 parts by weight of α-methyl styrene (AMS) at a constant rate from the time point where a polymerization conversion rate reached 20% to the time point where the polymerization conversion rate reached 75%. Polymerization was performed while continuously adding the entire amount of the second reaction solution at a constant rate. In this case, the time taken for a polymerization conversion rate to reach 20% after the initiation of polymerization was 120 minutes, and the continuous addition time of α-methyl styrene (AMS) was 360 minutes.

Polymerization was performed while raising the temperature inside the reactor to 120° C. at a constant rate for 20 minutes, performed for 220 minutes while maintaining the temperature inside the reactor at 120° C., and terminated to obtain a polymerization slurry.

Formic acid was added to the reactor so that the polymerization slurry had a pH of 2.5, and the resulting polymerization slurry was washed, dehydrated, and dried to prepare a bead-type polymer.

Comparative Example 13

<Preparation of First Reaction Solution>

70 parts by weight of α-methyl styrene (AMS), 30 parts by weight of acrylonitrile (AN), 150 parts by weight of ion-exchanged water, 0.6 parts by weight of an initiator (2,2-di(4,4-di(t-butylperoxy)cyclohexyl)propane), 1.3 parts by weight of a suspending agent (tricalcium phosphate), and 0.005 parts by weight of a suspending aid (RS-710 commercially available from TOHO Chemical Industry Co., Ltd.) were homogeneously mixed to prepare a first reaction solution.

<Preparation of Polymer>

The entire amount of the first reaction solution was added to a reactor, the temperature inside the reactor was raised to 100° C. to initiate polymerization, and polymerization was performed for 480 minutes. Subsequently, polymerization was performed while raising the temperature inside the reactor to 105° C. at a constant rate for 20 minutes, performed for 220 minutes while maintaining the temperature inside the reactor at 105° C., and terminated to obtain a polymerization slurry.

Formic acid was added to the reactor so that the polymerization slurry had a pH of 2.5, and the resulting polymerization slurry was washed, dehydrated, and dried to prepare a bead-type polymer.

Comparative Example 14

<Preparation of First Reaction Solution>

70 parts by weight of α-methyl styrene (AMS), 30 parts by weight of acrylonitrile (AN), 150 parts by weight of ion-exchanged water, 0.6 parts by weight of an initiator (1,1-di(t-butylperoxy)cyclohexane), 1.3 parts by weight of a suspending agent (tricalcium phosphate), and 0.005 parts by weight of a suspending aid (RS-710 commercially available from TOHO Chemical Industry Co., Ltd.) were homogeneously mixed to prepare a first reaction solution.
<Preparation of Polymer>

The entire amount of the first reaction solution was added to a reactor, the temperature inside the reactor was raised to 95° C. to initiate polymerization, and polymerization was performed for 480 minutes. Subsequently, polymerization was performed while raising the temperature inside the reactor to 100° C. at a constant rate for 20 minutes, performed for 220 minutes while maintaining the temperature inside the reactor at 100° C., and terminated to obtain a polymerization slurry.

Formic acid was added to the reactor so that the polymerization slurry had a pH of 2.5, and the resulting polymerization slurry was washed, dehydrated, and dried to prepare a bead-type polymer.

Experimental Example 1

The polymerization conversion rates of the polymerization slurries according to Examples and Comparative Examples were measured by the method described below, and results thereof are shown in Tables 1 to 5.

(1) Polymerization conversion rate (%): calculated by the following equation.

Polymerization conversion rate={(Total weight of monomers added until polymerization was terminated)−(Total weight of unreacted monomers when polymerization conversion rate was measured)}/(Total weight of monomers added until polymerization was terminated)×100

Experimental Example 2

The physical properties of the polymers according to Examples and Comparative Examples were measured by the methods described below, and results thereof are shown in Tables 1 to 5 below.

(1) Color comparison: The bead-type polymer was input into a vial for color comparison, and the polymer was vacuum-dried at 220° C. for 2 hours, and then the color thereof was evaluated. A CIE whiteness index (WI) and a CIE b value were measured, and a yellowness index (YI) was measured in accordance with ASTM D1925.
  ○ (good): a whiteness index of more than 80, a yellowness index of less than 3, and a b value of less than 2
  Δ (fair): a whiteness index of more than 70 and 80 or less, a yellowness index of 3 or more and 4 or less, and a b value of 2 or more and 3 or less
  x (poor): a whiteness index of 60 or more and 70 or less, a yellowness index of more than 4, and a b value of more than 3

(2) Weight-average molecular weight (g/mol): measured at 40° C. by gel permeation chromatography (model name: PL GPC220, manufacturer: Agilent Technologies) after the polymer was dissolved in tetrahydrofuran (THF), and polystyrene was used as a standard material.

(3) Molecular weight distribution: calculated by measuring a weight-average molecular weight and a number-average molecular weight by the method described in (2) and dividing the weight-average molecular weight by the number-average molecular weight.

(4) Melt flow index (g/10 min): measured under the condition of 220° C. and 10 kg in accordance with ASTM D1238.

TABLE 1

| Classification | | Example 1 | Example 2 | Example 3 | Example 4 | Example 5 |
|---|---|---|---|---|---|---|
| First reaction | α-Methyl styrene | 50 | 50 | 50 | 50 | 50 |
| solution (parts | Acrylonitrile | 30 | 30 | 30 | 30 | 30 |
| by weight) | t-BPCP | 0.2 | 0.2 | 0.2 | 0.2 | 0.2 |
| Second | Methyl styrene | 20 | 20 | 20 | 20 | 20 |
| reaction | t-BPCP | 0.4 | 0.4 | 0.4 | 0.4 | 0.4 |
| solution (parts | | | | | | |
| by weight) | | | | | | |
| Time of initiation of continuous addition of second reaction solution (polymerization conversion rate, %) | | 10 | 20 | 30 | 20 | 20 |
| Time of termination of continuous addition of second reaction solution (polymerization conversion rate, %) | | 75 | 75 | 75 | 70 | 80 |
| Total polymerization time (mins) | | 720 | 720 | 720 | 720 | 720 |
| Physical | Final polymerization | 97.9 | 98.1 | 98.0 | 98.3 | 96.3 |
| properties | conversion rate (%) | | | | | |
| | Color | ○ | ○ | ○ | ○ | ○ |
| | Weight-average molecular weight | 116,000 | 118,000 | 121,000 | 119,000 | 126,000 |

TABLE 1-continued

| Classification | | Example 1 | Example 2 | Example 3 | Example 4 | Example 5 |
|---|---|---|---|---|---|---|
| Molecular weight distribution | | 2.5 | 2.6 | 2.6 | 2.6 | 2.5 |
| Melt flow index | | 13.2 | 13.5 | 13.8 | 13.5 | 14.0 | t-BPCP: 2,2-di(4,4-di(t-butylperoxy)cyclohexyl)propane

TABLE 2

| Classification | | Example 6 | Example 7 | Example 8 | Example 9 |
|---|---|---|---|---|---|
| First reaction solution (parts by weight) | α-Methyl styrene | 50 | 50 | 50 | 50 |
| | Acrylonitrile | 30 | 30 | 30 | 30 |
| | t-BPCP | 0.4 | 0.4 | 0.0 | 0.0 |
| | t-BPC | 0.0 | 0.0 | 0.2 | 0.4 |
| Second reaction solution (parts by weight) | α-Methyl styrene | 20 | 20 | 20 | 20 |
| | t-BPCP | 0.2 | 0.0 | 0.0 | 0.0 |
| | PEP (t-BPC) | 0.0 | 0.2 | 0.0 | 0.0 |
| | t-BPC | 0.0 | 0.0 | 0.4 | 0.2 |
| Time of initiation of continuous addition of second reaction solution (polymerization conversion rate, %) | | 20 | 20 | 20 | 20 |
| Time of termination of continuous addition of second reaction solution (polymerization conversion rate, %) | | 75 | 75 | 75 | 75 |
| Total polymerization time (mins) | | 720 | 720 | 720 | 720 |
| Physical properties | Final polymerization conversion rate (%) | 98.2 | 98.4 | 97.8 | 98.0 |
| | Color | ○ | ○ | ○ | ○ |
| | Weight-average molecular weight | 114,000 | 112,000 | 125,000 | 119,000 |
| | Molecular weight distribution | 2.7 | 2.7 | 2.4 | 2.6 |
| | Melt flow index | 14.1 | 14.9 | 13.1 | 13.4 | t-BPCP: 2,2-di(4,4-di(t-butylperoxy)cyclohexyl)propane
PEP(t-BPC): polyether poly(t-butyl peroxy carbonate)
t-BPC: 1,1-di(t-butylperoxy)cyclohexane

TABLE 3

| Classification | | Comparative Example 1 | Comparative Example 2 | Comparative Example 3 | Comparative Example 4 |
|---|---|---|---|---|---|
| First reaction solution | α-Methyl styrene | 50 | 50 | 50 | 50 |
| | Acrylonitrile | 30 | 30 | 30 | 30 |
| | t-BPCP | 0.2 | 0.2 | 0.2 | 0.2 |
| Second reaction solution (parts by weight) | α-Methyl styrene | 20 | 20 | 20 | 20 |
| | t-BPCP | 0.4 | 0.4 | 0.4 | 0.4 |
| Time of initiation of continuous addition of second reaction solution (polymerization conversion rate, %) | | 7 | 34 | 20 | 20 |
| Time of termination of continuous addition of second reaction solution (polymerization conversion rate, %) | | 75 | 75 | 66 | 83 |
| Total polymerization time (mins) | | 720 | 720 | 720 | 720 |
| Physical properties | Final polymerization conversion rate (%) | 98.4 | 97.7 | 98.7 | 95.7 |
| | Color | ○ | Δ | Δ | ○ |
| | Weight-average molecular weight | 111,000 | 118,000 | 117,000 | 106,000 |
| | Molecular weight distribution | 2.42 | 2.4 | 2.4 | 2.1 |
| | Melt flow index | 11.7 | 12.8 | 12.5 | 12.0 | t-BPCP: 2,2-di(4,4-di(t-butylperoxy)cyclohexyl)propane

TABLE 4

| Classification | | Comparative Example 5 | Comparative Example 6 | Comparative Example 7 | Comparative Example 8 | Comparative Example 9 |
|---|---|---|---|---|---|---|
| First reaction solution (parts by weight) | α-Methyl styrene | 50 | 50 | 50 | 50 | 50 |
| | Acrylonitrile | 30 | 30 | 30 | 30 | 30 |
| | t-BPCP | 0.4 | 0.4 | 0.0 | 0.6 | 0.0 |
| | t-BPC | 0.0 | 0.0 | 0.4 | 0.0 | 0.6 |
| Second reaction solution (parts by weight) | α-Methyl styrene | 20 | 20 | 20 | 20 | 20 |
| | t-BPCP | 0.0 | 0.0 | 0.0 | 0.0 | 0.0 |
| | t-BPB | 0.2 | 0.0 | 0.2 | 0.0 | 0.0 |
| | DCP | 0.0 | 0.2 | 0.0 | 0.0 | 0.0 |
| Time of initiation of continuous addition of second reaction solution (polymerization conversion rate, %) | | 20 | 20 | 20 | 20 | 20 |
| Time of termination of continuous addition of second reaction solution (polymerization conversion rate, %) | | 75 | 75 | 75 | 75 | 75 |
| Total polymerization time (mins) | | 720 | 720 | 720 | 720 | 720 |
| Physical properties | Final polymerization conversion rate (%) | 97.6 | 96.8 | 97.4 | 98.3 | 98.1 |
| | Color | x | x | x | ○ | ○ |
| | Weight-average molecular weight | 107,000 | 109,000 | 112,000 | 101,000 | 104,000 |
| | Molecular weight distribution | 2.2 | 2.1 | 2.2 | 2.1 | 2.1 |
| | Melt flow index | 11.5 | 11.9 | 11.2 | 13.2 | 12.9 | t-BPCP: 2,2-di(4,4-di(t-butylperoxy)cyclohexyl)propane
PEP(t-BPC): polyether poly(t-butyl peroxy carbonate)
t-BPC: 1,1-di(t-butylperoxy)cyclohexane
t-BPB: t-butyl peroxybenzoate
DCP: dicumyl peroxide

TABLE 5

| Classification | | Comparative Example 10 | Comparative Example 11 | Comparative Example 12 | Comparative Example 13 | Comparative Example 14 |
|---|---|---|---|---|---|---|
| First reaction solution (parts by weight) | α-Methyl styrene | 50 | 50 | 50 | 70 | 70 |
| | Acrylonitrile | 30 | 30 | 30 | 30 | 30 |
| | t-BPCP | 0.0 | 0.0 | 0.0 | 0.6 | 0.0 |
| | t-BPC | 0.0 | 0.0 | 0.0 | 0.0 | 0.6 |
| | PEP(t-BPC) | 0.0 | 0.6 | 0.0 | 0.0 | 0.0 |
| | BPO | 0.6 | 0.0 | 0.0 | 0.0 | 0.0 |
| | t-BPB | 0.0 | 0.0 | 0.6 | 0.0 | 0.0 |
| Second reaction solution (parts by weight) | α-Methyl styrene | 20 | 20 | 20 | 0 | 0 |
| | t-BPCP | 0.0 | 0.0 | 0.0 | 0.0 | 0.0 |
| | TBPB | 0.0 | 0.0 | 0.0 | 0.0 | 0.0 |
| | DCP | 0.0 | 0.0 | 0.0 | 0.0 | 0.0 |
| Time of initiation of continuous addition of second reaction solution (polymerization conversion rate, %) | | 20 | 20 | 20 | continuous addition x | continuous addition x |
| Time of termination of continuous addition of second reaction solution (polymerization conversion rate, %) | | 60 | 75 | 75 | continuous addition x | continuous addition x |

TABLE 5-continued

|  | Classification | Comparative Example 10 | Comparative Example 11 | Comparative Example 12 | Comparative Example 13 | Comparative Example 14 |
|---|---|---|---|---|---|---|
| Total polymerization time (mins) | | 720 | 720 | 720 | 720 | 720 |
| Physical properties | Final polymerization conversion rate (%) | 80.4 | 97.1 | 92.2 | 97.1 | 96.9 |
| | Color | ○ | Δ | x | Δ | Δ |
| | Weight-average molecular weight | 69,000 | 101,000 | 87,000 | 85,000 | 89,000 |
| | Molecular weight distribution | 1.8 | 2.2 | 1.8 | 1.9 | 2.0 |
| | Melt flow index | 33.2 | 13.4 | 22.6 | 25.5 | 20.9 | t-BPCP: 2,2-di(4,4-di(t-butylperoxy)cyclohexyl)propane
PEP(t-BPC): polyether poly(t-butyl peroxy carbonate)
t-BPC: 1,1-di(t-butylperoxy)cyclohexane
t-BPB: t-butyl peroxybenzoate
DCP: dicumyl peroxide
BPO: benzoyl peroxide Referring to Tables 1 to 5, it can be seen that Examples 1 to 9, in which the continuous addition of an alkyl-substituted aromatic vinyl-based monomer and a multifunctional initiator was initiated when a polymerization conversion rate was 10 to 30% and terminated when a polymerization conversion rate was 70 to 80%, exhibited high final polymerization conversion rates, excellent color characteristics, excellent mechanical properties due to having high weight-average molecular weights, and excellent processability due to having a broad molecular weight distribution and high melt flow indices. However, it can be seen that Comparative Example 1, in which the continuous addition of an alkyl-substituted aromatic vinyl-based monomer and a multifunctional initiator was initiated when a polymerization conversion rate was 7%, exhibited degraded mechanical properties due to having a low weight-average molecular weight and degraded processability due to having a narrow molecular weight distribution and a low melt flow index as compared to Examples.

In addition, in the case of Comparative Example 2 in which the continuous addition of an alkyl-substituted aromatic vinyl-based monomer and a multifunctional initiator was initiated when a polymerization conversion rate was 34%, it can be seen that, since the continuous addition of an alkyl-substituted aromatic vinyl-based monomer was initiated late, a polymer prepared at an early stage of polymerization included an excessive amount of vinyl cyanide-based monomer unit, and accordingly, degraded color characteristics and degraded processability due to a low melt flow index were exhibited as compared to Examples.

Additionally, it can be seen that Comparative Example 3, in which the continuous addition of an alkyl-substituted aromatic vinyl-based monomer and a multifunctional initiator were terminated when a polymerization conversion rate was 66%, exhibited degraded color characteristics and degraded processability due to having a low melt flow index as compared to Examples.

In addition, it can be seen that Comparative Example 4, in which the continuous addition of an alkyl-substituted aromatic vinyl-based monomer and a multifunctional initiator were terminated when a polymerization conversion rate was 83%, exhibited degraded color characteristics, degraded mechanical properties due to having a low weight-average molecular weight, and degraded processability due to having a narrow molecular weight distribution and a low melt flow index as compared to Examples.

It can be seen that Comparative Examples 5 to 7, in which a multifunctional initiator was not used in continuous addition, exhibited degraded color characteristics, degraded mechanical properties due to having low weight-average molecular weights, and degraded processability due to having narrow molecular weight distribution and low melt flow indices as compared to Examples.

It can be seen that Comparative Examples 8 and 9, in which an initiator was added only before the initiation of polymerization and not continuously added after the initiation of polymerization, exhibited degraded mechanical properties due to having low weight-average molecular weights as compared to Examples.

It can be seen that Comparative Example 10, in which benzoyl peroxide was used instead of a multifunctional initiator before the initiation of polymerization and an initiator was not continuously added after the initiation of polymerization, exhibited a substantially decreased final polymerization conversion rate and degraded mechanical properties due to a very low weight-average molecular weight as compared to Examples.

It can be seen that Comparative Example 11, in which a multifunctional initiator was used before the initiation of polymerization and an initiator was not continuously added after the initiation of polymerization, exhibited substantially degraded color characteristics and substantially degraded mechanical properties due to having a very low weight-average molecular weight as compared to Examples.

It can be seen that Comparative Example 12, in which t-butyl peroxybenzoate was used instead of a multifunctional initiator before the initiation of polymerization and an initiator was not continuously added after the initiation of polymerization, exhibited substantially degraded color characteristics and substantially degraded mechanical properties due to having a very low weight-average molecular weight as compared to Examples.

It can be seen that Comparative Examples 13 and 14, in which α-methyl styrene and a multifunctional initiator were not continuously added after the initiation of polymerization, exhibited substantially degraded color characteristics and degraded mechanical properties due to having low weight-average molecular weights as compared to Examples.

The invention claimed is:

1. A method of preparing a polymer, comprising:

adding an alkyl-substituted aromatic vinyl-based monomer and a vinyl cyanide-based monomer to a reactor and initiating polymerization; and performing polymerization while continuously adding the alkyl-substituted aromatic vinyl-based monomer and a multifunctional initiator to the reactor, wherein the continuous addition of the alkyl-substituted aromatic vinyl-based monomer and the multifunctional initiator is initiated in response to a polymerization conversion rate being 10 to 30%, and wherein the continuous addition of the alkyl-substituted aromatic vinyl-based monomer and the multifunctional initiator is terminated in response to a polymerization conversion rate being 70 to 80%.

2. The method of claim 1, wherein the continuous addition of the alkyl-substituted aromatic vinyl-based monomer and the multifunctional initiator is initiated in response to a polymerization conversion rate being 15 to 25%.

3. The method of claim 1, wherein the continuous addition of the alkyl-substituted aromatic vinyl-based monomer and the multifunctional initiator is terminated in response to a polymerization conversion rate being 70 to 75%.

4. The method of claim 1, wherein the alkyl-substituted aromatic vinyl-based monomer and the multifunctional initiator are continuously added as a mixture.

5. The method of claim 1, wherein an amount of the alkyl-substituted aromatic vinyl-based monomer added in the continuous addition is 10 to 30 parts by weight with respect to 100 parts by weight of a total amount of monomers added in the method.

6. The method of claim 1, wherein an amount of the multifunctional initiator added in the continuous addition is 0.1 to 0.5 parts by weight with respect to 100 parts by weight of a total amount of monomers added in the method.

7. The method of claim 1, wherein the initiation of polymerization includes adding the multifunctional initiator.

8. The method of claim 1, wherein a total amount of the multifunctional initiator added in the method is 0.4 to 0.8 parts by weight with respect to 100 parts by weight of a total amount of monomers added in the method.

9. The method of claim 1, wherein the multifunctional initiator includes one or more of 2,2-di(4,4-di(t-butylperoxy)cyclohexyl)propane, 1,1-di(t-butylperoxy)cyclohexane, 1,1-di(t-amylperoxy)cyclohexane, 1,1-di(t-butylperoxy)-3,3,5-trimethylcyclohexane, or polyether poly(t-butyl peroxy carbonate).

10. The method of claim 1, wherein the polymerization is suspension polymerization.

11. The method of claim 1, wherein the multifunctional initiator includes one or more of 2,2-di(4,4-di(t-butylperoxy)cyclohexyl)propane, 1,1-di(t-butylperoxy)cyclohexane, or polyether poly(t-butyl peroxy carbonate).

* * * * *